US011394964B2

(12) United States Patent
Henry et al.

(10) Patent No.: US 11,394,964 B2
(45) Date of Patent: Jul. 19, 2022

(54) METHODS AND DEVICES FOR CODING AND DECODING A DATA STREAM REPRESENTATIVE OF AT LEAST ONE IMAGE

(71) Applicant: ORANGE, Issy-les-Moulineaux (FR)

(72) Inventors: Felix Henry, Chatillon (FR); Mohsen Abdoli, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/255,086

(22) PCT Filed: Jun. 18, 2019

(86) PCT No.: PCT/FR2019/051479
§ 371 (c)(1),
(2) Date: Dec. 22, 2020

(87) PCT Pub. No.: WO2020/002796
PCT Pub. Date: Jan. 2, 2020

(65) Prior Publication Data
US 2021/0266532 A1    Aug. 26, 2021

(30) Foreign Application Priority Data
Jun. 27, 2018    (FR) ...................................... 1855792

(51) Int. Cl.
*H04N 19/11* (2014.01)
*H04N 19/129* (2014.01)
(Continued)

(52) U.S. Cl.
CPC ........... *H04N 19/11* (2014.11); *H04N 19/129* (2014.11); *H04N 19/147* (2014.11);
(Continued)

(58) Field of Classification Search
CPC .... H04N 19/11; H04N 19/129; H04N 19/147; H04N 19/159; H04N 19/176;
(Continued)

(56) References Cited

U.S. PATENT DOCUMENTS

| 2008/0181309 A1* | 7/2008 | Lee ....................... | H04N 19/196 375/240.16 |
| 2016/0044310 A1* | 2/2016 | Park ..................... | H04N 19/176 375/240.12 |

(Continued)

FOREIGN PATENT DOCUMENTS

| FR | 2987966 A1 * | 9/2013 | ............. H04N 19/11 |
| FR | 2987966 A1 | 9/2013 | |

(Continued)

OTHER PUBLICATIONS

Matthias Wien, "High Efficiency Video Coding, Coding Tools and Specification", Signals and Communication Technology, DOI 10.1007/978-3-662-44276-0, dated 2015.

(Continued)

*Primary Examiner* — Dramos Kalapodas
(74) *Attorney, Agent, or Firm* — David D. Brush; Westman, Champlin & Koehler, P.A.

(57) ABSTRACT

Coding and decoding methods for coding and decoding a coded data stream representing at least one image split into blocks. The method includes, for a current block, determining if the current block is coded according to an intra coding mode or another coding mode, the intra coding mode using an intra prediction mode selected from a group of intra prediction modes, according to an intra prediction mode associated with a neighbouring block of the current block. When coded according to the intra coding mode, an intra prediction mode in the group is determined for the current block, according to an intra prediction mode associated with a previously decoded block of the image. The current block (Continued)

Figure 1:
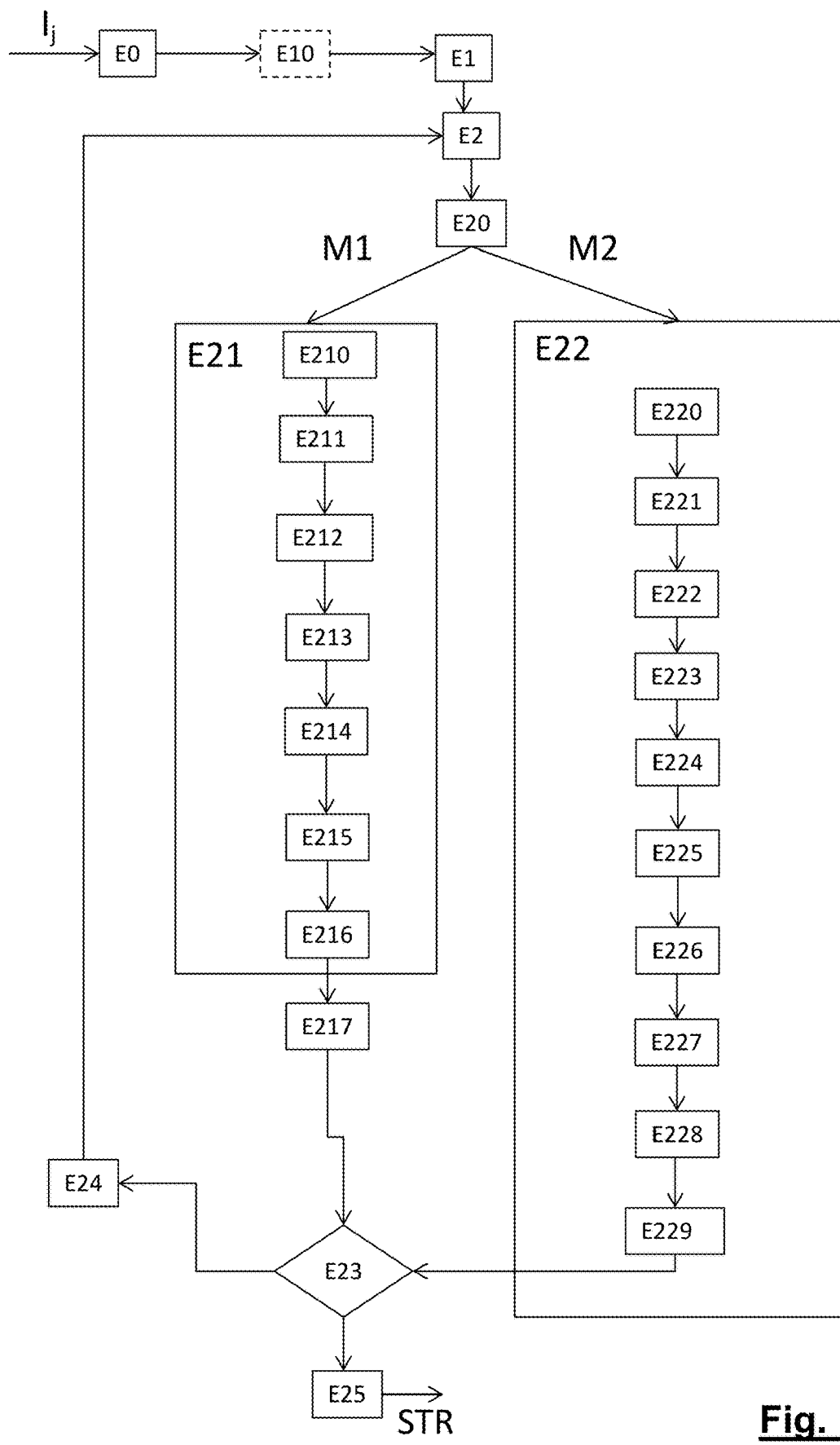

is decoded according to the determined intra prediction mode associated with the current block. When coded according to the other coding mode, the current block is decoded according to the other coding mode.

21 Claims, 4 Drawing Sheets

(51) Int. Cl.
*H04N 19/147* (2014.01)
*H04N 19/159* (2014.01)
*H04N 19/176* (2014.01)
*H04N 19/182* (2014.01)
*H04N 19/593* (2014.01)

(52) U.S. Cl.
CPC ......... *H04N 19/159* (2014.11); *H04N 19/176* (2014.11); *H04N 19/182* (2014.11); *H04N 19/593* (2014.11)

(58) Field of Classification Search
CPC .... H04N 19/182; H04N 19/593; H04N 19/61; H04N 19/154; H04N 19/463; H04N 19/103; H04N 19/19; H04N 19/119; H04N 19/122; H04N 19/186; H04N 19/60; H04N 19/70; H04N 19/96
See application file for complete search history.

(56) References Cited

U.S. PATENT DOCUMENTS

2020/0036985 A1* 1/2020 Jang ................... H04N 19/105
2020/0275124 A1* 8/2020 Ko ....................... H04N 19/159

FOREIGN PATENT DOCUMENTS

| WO | 2008093936 A1 | 8/2008 | |
| WO | WO-2008093936 A1 * | 8/2008 | .......... H04N 19/159 |
| WO | 2010086562 A1 | 8/2010 | |
| WO | WO-2010086562 A1 * | 8/2010 | .......... H04N 19/105 |
| WO | WO-2019002169 A1 * | 1/2019 | .......... H04N 19/105 |
| WO | WO-2021015524 A1 * | 1/2021 | |

OTHER PUBLICATIONS

International Search Report and Written Opinion dated Sep. 19, 2019 for corresponding International Application No. PCT/FR2019/051479, filed Jun. 18, 2019.

English translation of the Written Opinion of the International Searching Authority dated Sep. 27, 2019 for corresponding International Application No. PCT/FR2019/051479, filed Jun. 18, 2019.

* cited by examiner

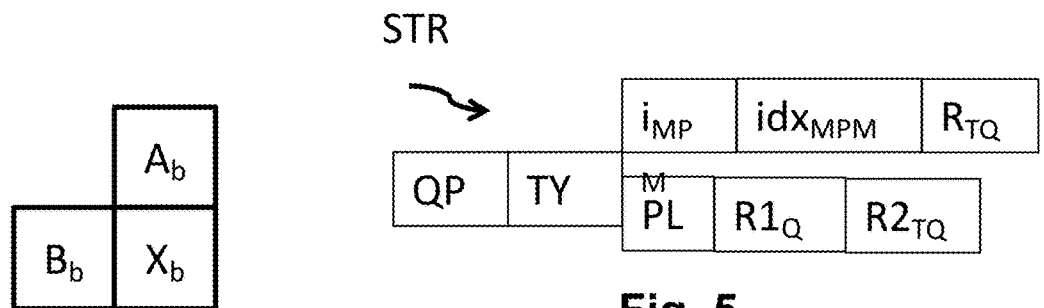
Fig. 2
Fig. 5
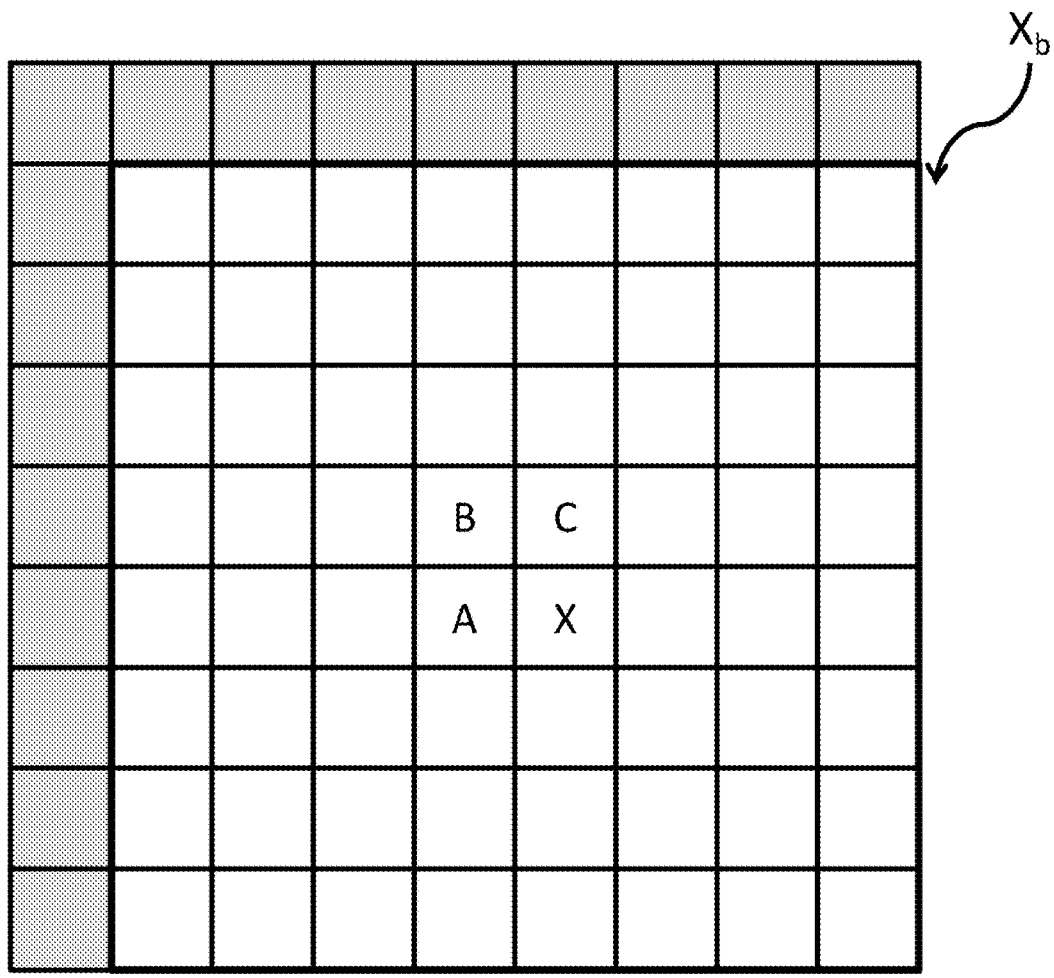
Fig. 3

METHODS AND DEVICES FOR CODING AND DECODING A DATA STREAM REPRESENTATIVE OF AT LEAST ONE IMAGE

CROSS-REFERENCE TO RELATED APPLICATIONS

This Application is a Section 371 National Stage Application of International Application No. PCT/FR2019/051479, filed Jun. 18, 2019, which is incorporated by reference in its entirety and published as WO 2020/002796 A1 on Jan. 2, 2020, not in English.

1. FIELD OF THE INVENTION

The field of the invention is that of coding and decoding images or sequences of images, and in particular video streams.

More specifically, the invention relates to the compression of images or sequences of images using a block representation of the images.

The invention can notably be applied to the image or video coding implemented in the current or future encoders (JPEG, MPEG, H.264, HEVC, etc. and their amendments), and to the corresponding decoding.

2. PRIOR ART

Digital images and sequences of images take up a lot of space in terms of memory, which requires, when transmitting these images, to compress them in order to avoid congestion problems on the network used for this transmission.

Many techniques for compressing video data are already known. Among these, the HEVC compression standard ("High Efficiency Video Coding, Coding Tools and Specification", Matthias Wien, Signals and Communication Technology, 2015) proposes to implement a prediction of pixels of a current image in relation to other pixels belonging to the same image (intra prediction) or to a previous or subsequent image (inter prediction).

More specifically, the intra prediction uses the spatial redundancies within an image. To do this, the images are split into blocks of pixels. The blocks of pixels are then predicted using already reconstructed information, corresponding to the previously coded/decoded blocks in the current image according to the scanning order of the blocks in the image.

Furthermore, in a conventional manner, the coding of a current block is carried out using a prediction of the current block, referred to as the predictor block, and a prediction residue or "residual block", corresponding to a difference between the current block and the predictor block. The resulting residual block is then transformed, for example using a DCT (discrete cosine transform) type transform. The coefficients of the transformed residual block are then quantized, coded by entropy coding and transmitted to the decoder, that can reconstruct the current block by adding this residual block to the predictor block.

The decoding is done image by image, and for each image, block by block. For each block, the corresponding elements of the stream are read. The inverse quantization and the inverse transform of the coefficients of the residual block are performed. Then, the block prediction is calculated to obtain the predictor block, and the current block is reconstructed by adding the prediction (i.e. the predictor block) to the decoded residual block.

In the HEVC standard, it is possible to perform an intra prediction of a current block according to 35 different intra prediction modes. The HEVC standard defines two lists of prediction modes for coding the intra prediction mode selected to code a current block:

- a first list referred to as MPM (Most Probable Mode) comprising the 3 most probable intra prediction modes for the current block, such an MPM list being defined from the prediction modes previously selected during the coding of the neighbouring blocks of the current block,
- a second list referred to as non-MPM list comprising the 32 other intra prediction modes, i.e. the intra prediction modes that are not comprised in the MPM list.

According to the HEVC standard, the MPM list is constructed according to the intra prediction modes used to code the neighbouring blocks of the current block located respectively on the left of and above the current block. However, the construction mechanism of the MPM list of the HEVC standard does not require an intra predictive mode to be systematically available for the neighbouring blocks. When at least one of the neighbouring blocks has not been previously coded using an intra prediction mode, the construction mechanism of the MPM list populates the MPM list using one or more default intra prediction modes.

It appears that according to this coding mechanism of an intra prediction mode (use of an MPM list), when the neighbouring blocks are not coded according to an intra prediction mode, the coding cost of an intra prediction mode for the current block is high. Moreover, when new intra prediction modes are used in addition to the existing conventional intra prediction modes (for example those of the HEVC or H.264, or other standards), the use of a new intra prediction mode or an inter prediction mode for the current block impacts the coding cost of an intra prediction mode for the subsequent blocks of the picture that are coded in intra mode.

There is therefore a need for a new coding and decoding method to improve the compression of image or video data.

3. SUMMARY OF THE INVENTION

The invention improves the state of the art. For this purpose, it relates to a method for decoding a coded data stream representative of at least one image that is split into blocks. The decoding method comprises the following steps, for at least one block of the image, referred to as the current block:

determining if the current block is coded according to an intra coding mode or another coding mode, the intra coding mode being a coding mode using an intra prediction mode selected from a group of intra prediction modes, according to at least one intra prediction mode associated with a neighbouring block of the current block, when the current block is coded according to said intra coding mode:

determining, for the current block, an intra prediction mode in said group of intra prediction modes, according to at least one intra prediction mode associated with a previously decoded block of the image, decoding said current block according to said determined intra prediction mode, associating with said current block said determined intra prediction mode, when the current block is coded according to said other coding mode:
  decoding said current block according to said other coding mode,
  determining, for the current block, an intra prediction mode, in said group of intra prediction modes,
  associating with said current block said determined intra prediction mode.

According to the invention, when a block is coded according to a coding mode different from a conventional intra coding mode, i.e. an intra coding mode, such as the one defined for example in the HEVC standard, an intra prediction mode is determined and associated with the block. Such an intra prediction mode associated with a current block is "fictitious" since it is not used, in this case, for decoding the current block. Such an intra prediction mode associated with the current block can then be used to decode a subsequent block in the image if it is coded according to the conventional intra coding mode, or to associate an intra prediction mode with the subsequent block if the subsequent block is coded according to another coding mode. The conventional intra coding mode corresponds to any type of intra coding mode using an intra prediction mode selected from a group of intra prediction modes, according to an intra prediction mode that was used to predict a previously decoded block neighbouring the current block. For example, it can be an intra coding mode according to the H.264/AVC standard, or HEVC, or others.

The other coding mode can correspond to any type of coding mode distinct from the conventional intra coding mode, for example an inter coding mode, another type of intra coding mode (based on DPCM—Differential Pulse-Code Modulation or ILR—In-Loop Residual), based on a "template matching" technique . . . ).

The invention also relates to a method for coding a coded data stream representative of at least one image that is split into blocks, the coding method comprises the following steps, for at least one block of the image, referred to as the current block:
  determining if the current block is coded according to an intra coding mode or another coding mode, the intra coding mode being a coding mode using an intra prediction mode selected from a group of intra prediction modes according to at least one intra prediction mode associated with a neighbouring block of the current block,
  when the current block is coded according to said intra coding mode:
    determining, for the current block, an intra prediction mode in a group of intra prediction modes, according to at least one intra prediction mode associated with a previously decoded block of the image,
    coding said current block according to said determined intra prediction mode,
    associating with said current block said determined intra prediction mode,
  when the current block is coded according to said other coding mode:
    coding said current block according to said other coding mode,
    determining, for the current block, an intra prediction mode in said group of intra prediction modes,
    associating with said current block said determined intra prediction mode.

According to a particular embodiment of the invention, the determination of an intra prediction mode in a group of intra prediction modes, according to at least one intra prediction mode associated with a previously decoded block of the image, comprises the construction of a list comprising a subset of intra prediction modes selected from said group of intra prediction modes according to said at least one intra prediction mode associated with a previously decoded block of the image. For example, such a list can correspond to the list of most probable prediction modes as defined according to the HEVC standard.

Furthermore, according to this particular embodiment of the invention, when the current block is coded according to said other coding mode, the determination of an intra prediction mode in said group of intra prediction modes comprises the construction of at least one part of said list for the current block, and the determined intra prediction mode corresponds to the first intra prediction mode in the list.

According to this particular embodiment of the invention, a list comprising a subset of intra prediction modes is created, for example to predict an intra prediction mode used to predict the current block when it is coded according to the intra coding mode, for example similarly to the construction mechanism of the MPM list of the HEVC standard. When the current block is coded according to another coding mode, a similar list construction mechanism is implemented, according to which at least one part of the list is created, so as to select the first intra prediction mode in this list to associate it with the current block.

According to another particular embodiment of the invention, when the current block is coded according to said other coding mode, the determined intra prediction mode corresponds to a predetermined prediction mode.

According to this particular embodiment of the invention, the association of an intra prediction mode not used to code/decode the current block is fast since it is a predetermined prediction mode, for example it can be the PLANAR intra prediction mode of the HEVC standard. It can also be a default intra prediction mode transmitted in the stream, at the image or sequence of images level.

According to another particular embodiment of the invention, when the current block is coded according to said other coding mode, the intra prediction mode determined for the current block corresponds to an intra prediction mode selected from at least one subset of the group of intra prediction modes as providing a predicted block for the current block for which a distortion calculated between said predicted block and the decoded current block is minimal.

According to this particular embodiment of the invention, a selection is made of the intra prediction mode which best approximates the decoded current block, from the possible intra prediction modes, or from some of these intra prediction modes only. For example, all the intra prediction modes can be tested or only those comprised in the list of most probable intra prediction modes.

According to another particular embodiment of the invention, when the current block is coded according to said other coding mode, the decoding of said current block comprising a prediction of said current block providing a first predicted current block, the intra prediction mode determined for the current block corresponds to an intra prediction mode selected from at least one subset of the group of intra prediction modes as providing a second predicted block for the current block for which a distortion calculated between said second predicted block and said first predicted current block is minimal.

According to this particular embodiment of the invention, the selected intra prediction mode is the one that best approximates the predicted current block obtained when decoding the current block.

According to another particular embodiment of the invention, the prediction of said current block providing a first predicted current block comprises, for each pixel of the current block, obtaining a prediction of said pixel from another previously decoded pixel, said other previously decoded pixel belonging to said current block or to a previously decoded block of the image, and when said other previously decoded pixel belongs to said current block, said other previously decoded pixel is obtained by:

decoding a prediction residue associated with said other pixel, reconstructing said other pixel by adding a prediction of said other pixel to the decoded residue.

According to this embodiment variant of the invention, the prediction of the current block is obtained by coding/decoding the block pixel by pixel, for example according to a DPCM or ILR technique.

According to another particular embodiment of the invention, when the current block is coded according to said other coding mode, the decoding of said current block comprising:

determining a local prediction function for the current block from a group of predetermined local prediction functions, predicting said current block comprising, for each pixel of the current block:

obtaining a prediction of said pixel according to said local prediction function using at least one previously decoded pixel neighbouring said pixel, said previously decoded pixel belonging to said current block or to a previously decoded block of the image, the intra prediction mode determined for the current block corresponds to an intra prediction mode selected from the group of intra prediction modes according to the local prediction function.

According to this particular embodiment of the invention, the prediction of the current block is obtained by coding/decoding the current block pixel by pixel according to a local prediction function using previously decoded pixels neighbouring the current pixel. The intra prediction mode is then selected according to the local prediction function.

According to another particular embodiment of the invention, the intra prediction mode for the current block is determined from a correspondence table associating an intra prediction mode with a local prediction function of the group of predetermined local prediction functions.

According to another particular embodiment of the invention, for a neighbouring block of the current block, located after the current block according to a scanning order of the blocks of the image for coding or decoding, the neighbouring block being coded according to said intra coding mode, the method comprises:

determining, for the current block, an intra prediction mode in a group of intra prediction modes, according to at least the intra prediction mode associated with the current block, decoding or coding said neighbouring block according to said determined intra prediction mode, associating with said neighbouring block said determined intra prediction mode.

According to another particular embodiment of the invention, for a neighbouring block of the current block, located after the current block according to a scanning order of the blocks of the image for coding or decoding, the neighbouring block being coded according to said other coding mode, the method comprises:

decoding or coding said neighbouring block according to said other coding mode, determining, for the neighbouring block, an intra prediction mode in said group of intra prediction modes, according to the intra prediction mode associated with the current block, associating with said neighbouring block said determined intra prediction mode.

The invention also relates to a decoding device configured to implement the decoding method according to any one of the particular embodiments defined above. This decoding device could, of course, comprise the different characteristics relating to the decoding method according to the invention. Thus, the characteristics and advantages of this decoding device are the same as those of the decoding method, and they are not detailed further.

The decoding device comprises in particular a processor configured, for at least one block of the image, referred to as the current block, to:

determine if the current block is coded according to an intra coding mode or another coding mode, the intra coding mode being a coding mode using an intra prediction mode selected from a group of intra prediction modes according to at least one intra prediction mode associated with a neighbouring block of the current block, when the current block is coded according to said intra coding mode:

determine, for the current block, an intra prediction mode in a group of intra prediction modes, according to at least one intra prediction mode associated with a previously decoded block of the image, decode said current block according to said determined intra prediction mode, associate said determined intra prediction mode with said current block, when the current block is coded according to said other coding mode:

decode said current block according to said other coding mode, determine, for the current block, an intra prediction mode in said group of intra prediction modes, associate said determined intra prediction mode with said current block.

According to a particular embodiment of the invention, such a decoding device is comprised in a terminal.

The invention also relates to a coding device configured to implement the coding method according to any one of the particular embodiments defined above. This coding device could, of course, comprise the different characteristics relating to the coding method according to the invention. Thus, the characteristics and advantages of this coding device are the same as those of the coding method, and they are not detailed further.

The coding device comprises in particular a processor configured, for at least one block of the image, referred to as the current block, to:

determine if the current block is coded according to an intra coding mode or another coding mode, the intra coding mode being a coding mode using an intra prediction mode selected from a group of intra prediction modes according to at least one intra prediction mode associated with a neighbouring block of the current block, when the current block is coded according to said intra coding mode:
    determine, for the current block, an intra prediction mode in a group of intra prediction modes, according to at least one intra prediction mode associated with a previously decoded block of the image,
    code said current block according to said determined intra prediction mode,
    associate said determined intra prediction mode with said current block,
when the current block is coded according to said other coding mode:
    code said current block according to said other coding mode,
    determine, for the current block, an intra prediction mode in said group of intra prediction modes,
    associate said determined intra prediction mode with said current block.

According to a particular embodiment of the invention, such a coding device is comprised in a terminal, or a server.

The decoding method, respectively the coding method, according to the invention can be implemented in various ways, notably in wired form or in software form. According to a particular embodiment of the invention, the decoding method, respectively the coding method, is implemented by a computer program. The invention also relates to a computer program comprising instructions for implementing the decoding method or the coding method according to any one of the particular embodiments previously described, when said program is executed by a processor. Such a program can use any programming language. It can be downloaded from a communication network and/or recorded on a computer-readable medium.

This program can use any programming language, and can be in the form of source code, object code, or intermediate code between source code and object code, such as in a partially compiled form, or in any other desirable form.

The invention also relates to a computer-readable storage medium or data medium comprising instructions of a computer program as mentioned above. The recording media mentioned above can be any entity or device able to store the program. For example, the medium can comprise a storage means such as a memory. On the other hand, the recording media can correspond to a transmissible medium such as an electrical or optical signal, that can be carried via an electrical or optical cable, by radio or by other means. The program according to the invention can be downloaded in particular on an Internet-type network.

Alternatively, the recording media can correspond to an integrated circuit in which the program is embedded, the circuit being adapted to execute or to be used in the execution of the method in question.

4. LIST OF FIGURES

Figure 4:
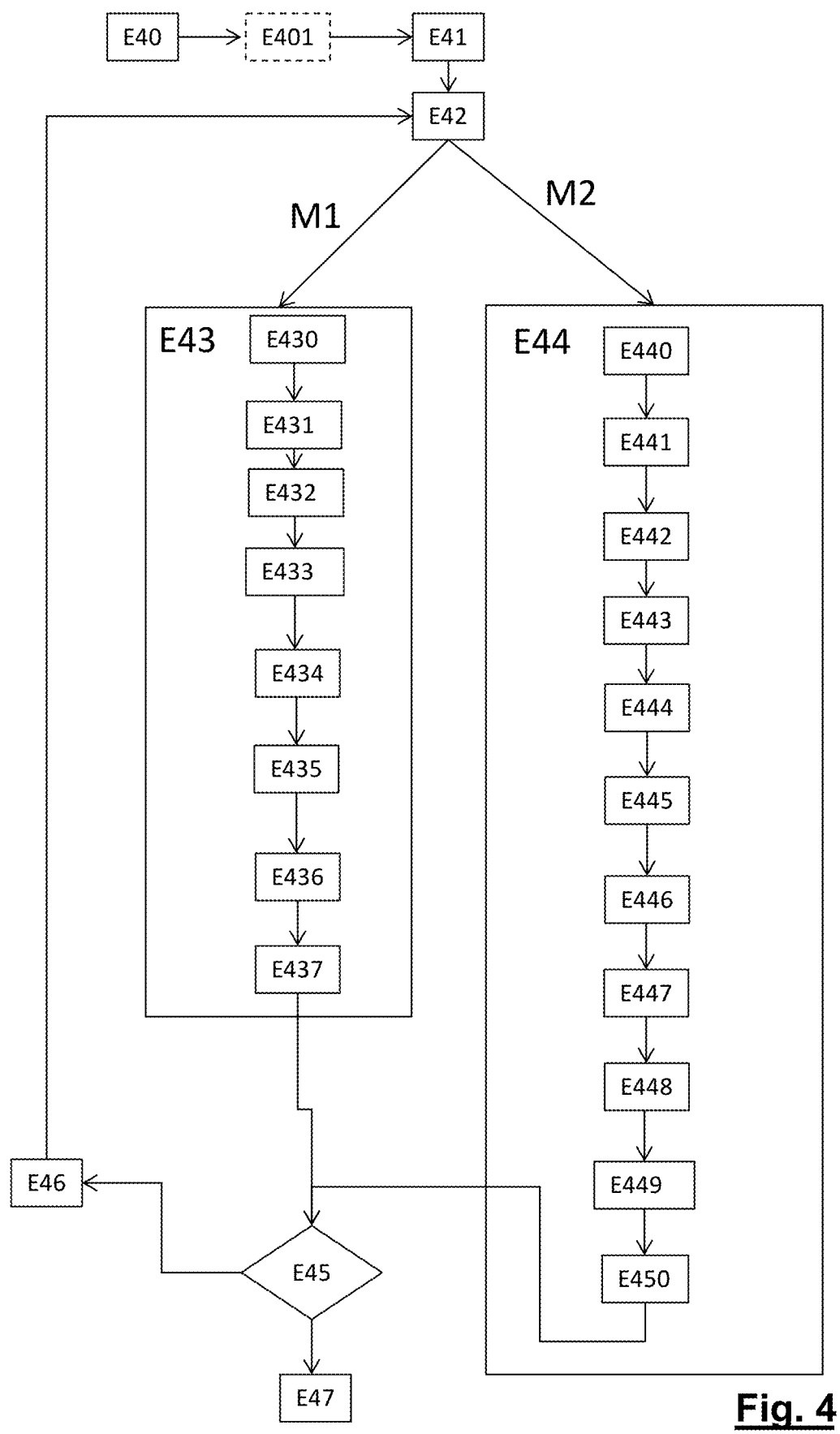
Figure 6:
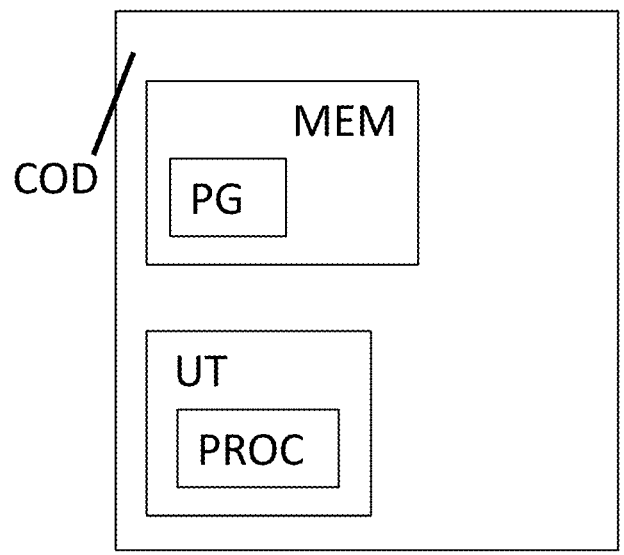
Figure 7:
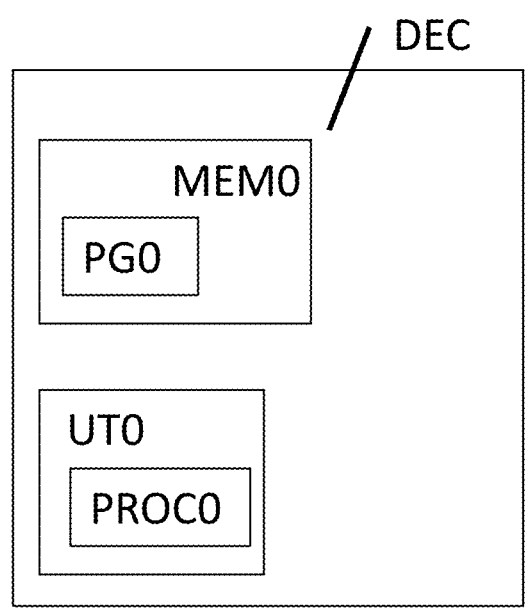

Other characteristics and advantages of the invention will emerge more clearly upon reading the following description of a particular embodiment, provided as a simple illustrative non-restrictive example, and the annexed drawings, wherein:

FIG. 1 shows steps of the coding method according to a particular embodiment of the invention, FIG. 2 illustrates a position example of the neighbouring blocks of a current block to determine an intra prediction mode according to a particular embodiment of the invention, FIG. 3 illustrates a position example of the reference pixels used to predict pixels of a current block according to a particular embodiment of the invention, FIG. 4 shows steps of the decoding method according to a particular embodiment of the invention, FIG. 5 illustrates a signal example comprising coded data representative of at least one block of an image according to a particular embodiment of the invention, FIG. 6 shows the simplified structure of a coding device adapted to implement the coding method according to any one of the particular embodiments of the invention, FIG. 7 shows the simplified structure of a decoding device adapted to implement the decoding method according to any one of the particular embodiments of the invention.

5. DESCRIPTION OF AN EMBODIMENT OF THE INVENTION

5.1 General Principle

The general principle of the invention is to associate an intra prediction mode determined in a group of intra prediction modes defined for an intra coding mode with a block of an image coded according to another coding mode distinct from the intra coding mode.

Classically, when a block of the image is coded according to the intra coding mode, the prediction mode used to code this block is coded in the stream. Such a prediction mode defined for an intra coding mode is predicted from the intra prediction modes used to code neighbouring blocks of the block. According to the invention, when a neighbouring block has not been coded according to the intra coding mode, and therefore no intra prediction mode defined for the intra coding mode has been used to code this neighbouring block, the neighbouring block still has an intra prediction mode associated with this neighbouring block.

The intra prediction mode associated with the neighbouring block can thus be used to predict the intra prediction mode of a block coded according to an intra coding mode, or to determine an intra prediction mode to be associated with this block, when this block is coded according to another coding mode.

The invention thus improves the compression performance.

5.2 Embodiments

FIG. 1 shows steps of the coding method according to a particular embodiment of the invention. For example, a sequence of images $I_1, I_2, \ldots, I_{Nb}$ is coded in the form of a coded data stream STR according to a particular embodiment of the invention. For example, such a coding method is implemented by a coding device as described later in relation to FIG. 6.

A sequence of images $I_1, I_2, \ldots, I_{Nb}$, Nb being the number of images of the sequence to be coded, is provided as input of the coding method. The coding method outputs a coded data stream STR representative of the sequence of images provided as input.

In a known manner, the coding of the sequence of images $I_1, I_2, \ldots, I_{Nb}$ is done image by image according to a coding order previously established and known to the decoder. For example, the images can be coded in the temporal order $I_1, I_2, \ldots, I_{Nb}$ or in another order, for example $I_1, I_3, I_2, \ldots, I_{Nb}$.

In a step E0, an image $I_j$ to be coded of the sequence of images $I_1, I_2, \ldots, I_{Nb}$ is split into blocks, for example into blocks of size 32×32 or 64×64 pixels or more. Such a block can be subdivided into square or rectangular sub-blocks, for example 16×16, 8×8, 4×4, 16×8, 8×16 . . . .

In an optional step E10, according to a particular embodiment of the invention, a quantization parameter QP is coded in the data stream STR, at the data coded for the image $I_j$ or at the data coded for the sequence of images.

Then, in a step E1, a first block or sub-block $X_b$ to be coded of the image $I_j$ is selected according to a predetermined scanning order of the image $I_j$. For example, it can be the first block in the lexicographical scanning order of the image.

In a step E2, the encoder chooses the coding mode to code the current block $X_b$.

According to the particular embodiment described here, the encoder selects the coding mode to code the current block $X_b$ from a first coding mode M1 and a second coding mode M2.

Additional coding modes (not described here) can be used.

According to the particular embodiment described here, the first coding mode M1 corresponds to the coding of the current block by conventional intra prediction, for example as defined according to the HEVC standard, and the second coding mode M2 corresponds to the In-Loop Residual (ILR) prediction coding.

The principle of the invention can be extended to other types of coding modes, whether for the first coding mode M1 or the second coding mode M2. For example, the first coding mode can correspond to any type of intra coding modes in which the intra prediction mode used to code a block is coded by prediction from the intra prediction mode of the previously decoded neighbouring blocks when it exists. This is for example the case of the intra coding mode according to the H.264 or HEVC standards or in the experimental JEM software available at the Internet address (https://jvet.hhi.fraunhofer.de/).

The second coding mode can correspond to any type of coding modes available to the encoder/decoder, for example inter-image coding mode, a template matching coding mode . . . .

In step E2, the encoder can perform a rate/distortion optimisation to determine the best coding mode to code the current block. During this rate/distortion optimisation, additional coding modes distinct from the first and the second coding modes can be tested, for example an inter mode coding mode. During this rate/distortion optimisation, the encoder simulates the coding of the current block $X_b$ according to the different available coding modes in order to determine the rate and the distortion associated with each coding mode and selects the coding mode offering the best rate/distortion compromise, for example according to the D+λR, or R function, where R is the rate required to code the current block according to the evaluated coding mode and D is the distortion measured between the decoded block and the original current block, and λ is a Lagrangian multiplier, for example entered by the user or defined at the encoder.

In a step E20, an item of information indicating the coding mode selected for the current block is coded in the data stream STR.

If the current block $X_b$ is coded according to the first coding mode M1, the method proceeds to step E21 for coding the block according to M1. If the current block $X_b$ is coded according to the second coding mode M2, the method proceeds to step E22 for coding the block according to M2.

Step E21 for coding the block according to the first coding mode M1, according to a particular embodiment of the invention, is described below. According to the particular mode described here, the first coding mode corresponds to a conventional intra prediction, such as the one defined in the HEVC standard.

According to a particular embodiment of the invention, during a step E210, a quantization step $\delta_1$ is determined. For example, the quantization step $\delta_1$ can be set by the user, or calculated using a quantization parameter setting a compromise between compression and quality and entered by the user or defined by the encoder. Thus, such a quantization parameter can be the parameter λ, used in the rate-distortion cost function D+λ·R where D represents the distortion introduced by the coding and R the rate used for coding. This function is used to make coding choices. Typically, a way of coding the image that minimises this function is sought.

As a variant, the quantization parameter can be QP, corresponding to the quantization parameter conventionally used in the AVC or HEVC standards. Thus, in the HEVC standard, the quantization step $\delta_1$ is determined by the equation $\delta_1$=levelScale[QP %6]<<(QP/6)) where levelScale [k]={40, 45, 51, 57, 64, 72} for k=0.5.

In a step E211, a prediction of the current block is determined using a conventional intra prediction mode. According to this conventional intra prediction, each predicted pixel is calculated only from the decoded pixels originating from the neighbouring blocks (reference pixels) located above the current block, and to the left of the current block. The way the pixels are predicted from the reference pixels depends on a prediction mode that is transmitted to the decoder, and that is chosen by the encoder from a predetermined set of modes known to the encoder and the decoder.

Thus, in HEVC there are 35 possible prediction modes: 33 modes that interpolate the reference pixels in 33 different angular directions, and 2 other modes: the DC mode in which each pixel of the predicted block is produced from the average of the reference pixels, and the PLANAR mode, that performs a planar and non-directional interpolation. This "conventional intra prediction" is well known and also used in the ITU-T H.264 standard (where there are only 9 different modes) as well as in the experimental JEM software available at the Internet address (https://jvet.hhi.fraunhofer.de/), where there are 67 different prediction modes. In all cases, the conventional intra prediction respects the two aspects mentioned above (prediction of the pixels from the neighbouring blocks and transmission to the decoder of a prediction mode).

In step E211, the encoder thus chooses one of the available prediction modes from the predetermined list of prediction modes. One way to choose consists for example in evaluating all the prediction modes and keeping the prediction mode that minimises a cost function such as, classically, the rate-distortion cost.

In a step E212, the prediction mode chosen for the current block is coded from the neighbouring blocks of the current block. FIG. 2 shows a position example of the neighbouring blocks $A_b$ and $B_b$ of the current block $X_b$ to code the prediction mode of the current block $X_b$.

In step E212, the intra prediction mode chosen for the current block is coded using the intra prediction modes associated with the neighbouring blocks.

According to the particular embodiment of the invention described here, the intra prediction mode associated with a block is:

the intra prediction mode that was used to predict the block, if the block was coded by a conventional intra prediction coding mode.

the intra prediction mode that was associated with the block, if the block was coded by another coding mode distinct from the conventional intra prediction coding mode. An example of such an association is described later in reference to step E229.

Thus, the approach described in the HEVC standard for coding the prediction mode of the current block can be used. Such an approach consists, in the example in FIG. 2, in identifying the intra prediction mode $m_A$ associated with the block $A_b$ located above the current block, and the intra prediction mode $m_B$ associated with the block $B_b$ located just to the left of the current block. Depending on the value of $m_A$ and $m_B$, a list called MPM (for Most Probable Mode), containing 3 intra prediction modes, and a list called non-MPM, containing the 32 other prediction modes, are created.

According to the particular embodiment described here, the mechanism for creating the MPM list specified according to the HEVC standard is adapted in order to take into account the association of an intra prediction mode with a block during its coding, when this block is not coded according to the conventional intra coding mode (step E229 described later). Thus, a neighbouring block of the current block always has an intra prediction mode associated with it, whether this block was coded according to an intra coding mode or according to another coding mode (ILR, inter, etc.).

The rest of the mechanism for creating the MPM list remains similar to the one specified according to the HEVC standard. If $m_A$ and $m_B$ are both equal to the same intra prediction mode and that intra prediction mode is the DC or PLANAR prediction mode, the MPM list includes the following prediction modes: MPM[0]=PLANAR, MPM[1]=DC, MPM[2]=A(26) corresponding to the angular prediction mode at the index 26 of the HEVC intra prediction mode table.

If $m_A$ and $m_B$ are both equal to the same angular prediction mode m(n), the MPM list comprises the following prediction modes: MPM[0]=m(n), MPM[1]=m(2+(n+29)mod 32), MPM[2]=m(2+(n−1)mod 32).

If $m_A$ and $m_B$ are different, the MPM list comprises the following prediction modes: MPM[0]=$m_B$, MPM[1]=$m_A$, MPM[2]=Mlast, where Mlast is defined by:
 if $m_B$ is not equal to the PLANAR mode and $m_A$ is not equal to the PLANAR mode, then Mlast is equal to the PLANAR mode,
 if not, if $m_B$ is not equal to the DC mode and $m_A$ is not equal to the DC mode, then Mlast is equal to the DC mode,
 otherwise Mlast is equal to the angular mode A(26).

The non-MPM list comprises all the other intra prediction modes not comprised in the MPM list.

According to the HEVC standard, in order to code the intra prediction mode of the current block, syntax elements are transmitted:
 a binary indicator indicating if the prediction mode to be coded for the current block is in the MPM list or not,
 if the prediction mode of the current block belongs to the MPM list, an index in the MPM list corresponding to the prediction mode of the current block is coded,
 if the prediction mode of the current block does not belong to the MPM list, an index in the non-MPM list corresponding to the prediction mode of the current block is coded.

In a step E213, the prediction residue R for the current block is constructed.

In step E213, in a conventional manner, a predicted block P is constructed according to the prediction mode chosen in step E211. Then, the prediction residue R is obtained by calculating the difference for each pixel between the predicted block P and the original current block.

In a step E214, the prediction residue R is transformed into $R_T$.

In step E214, a frequency transform is applied to the residue block R in order to produce the block $R_T$ comprising transform coefficients. The transform could be a DCT-type transform for example. It is possible to choose the transform to be used from a predetermined set of transforms $E_T$ and to inform the decoder of the transform used.

In a step E215, the transformed residue block $R_T$ is quantized using for example a quantization step scalar quantization $\delta_1$. This produces the quantized transformed prediction residue block $R_{TQ}$.

In a step E216, the coefficients of the quantized block $R_{TQ}$ are coded by an entropy encoder. For example, the entropy coding specified in the HEVC standard can be used.

According to the embodiment variant described here, in a step E217, the prediction mode determined in step E211 is associated with the current block.

In a known manner, the current block is decoded by dequantizing the coefficients of the quantized block $R_{TQ}$, then applying the inverse transform to the dequantized coefficients to obtain the decoded prediction residue. The prediction is then added to the decoded prediction residue in order to reconstruct the current block and obtain its decoded version. The decoded version of the current block can then be used later to spatially predict other neighbouring blocks of the image or to predict blocks of other images by inter-image prediction.

Step E22 for coding the block according to the second coding mode M2, according to a particular embodiment of the invention, is described below. According to the particular embodiment described here, the second coding mode corresponds to an ILR prediction coding.

In a step E220, a local predictor PL for the current block is determined. According to the coding mode described here, the pixels of the current block are predicted by previously reconstructed pixels of a neighbouring block of the current block or of the current block itself.

Preferably, for the prediction, pixels that are as close as possible to the pixel to be predicted are chosen. This is why it is referred to a local predictor. The local predictor PL can also be assimilated to a prediction mode of the current block associated with the second coding mode M2. According to this interpretation, in the particular embodiment described here, the first coding mode uses a first group of intra prediction modes, for example the intra prediction modes defined by the HEVC standard, and the second coding mode, here the ILR mode, uses a second group of prediction modes distinct from the first group of intra prediction modes. According to an embodiment variant described later, a correspondence between these two groups of prediction modes can be determined.

The local predictor PL can be unique or it can be selected from a set of predetermined local predictors (second group of prediction modes).

According to an embodiment variant, 4 local predictors are defined. Thus, if we call X a current pixel to be predicted from the current block, A the pixel located immediately to the left of X, B the pixel located immediately to the left of and above X, C the pixel located immediately above X, as illustrated in FIG. 3 showing a current block $X_b$. 4 local predictors PL1, PL2, PL3, PL4 can be defined as follows:

PL1(X)=min(A,B) if C≥max(A,B)
max(A,B) if C≤min(A,B)
A+B−C otherwise
PL2(X)=A
PL3(X)=B
PL4(X)=C where min(A,B) corresponds to the function returning the smallest value between the value of A and the value of B and max(A,B) corresponds to the function returning the largest value between the value of A and the value of B.

In step E220, the local predictor PL used for the current block is determined. In other words, the same local predictor will be used for all the pixels of the current block, i.e. the same prediction function. For this purpose, several embodiment variants are possible.

The coding of the current block with each of the predictors can be simulated (similarly to an optimisation to choose a coding mode for the current block), and the local predictor that optimises a cost function (for example, that minimises the D+λ·R function where R is the rate used to code the block, D is the distortion of the decoded block relative to the original block, and λ is a parameter set by the user) is selected.

Or, in order to limit the complexity of selecting a local predictor for the current block, an orientation of the texture of the previously coded pixels is analysed. For example, the previously coded pixels in the block that are located above or to the left of the current block are analysed using a Sobel-type operator. If it is determined that:

the orientation is horizontal, the local predictor PL2 is selected,
the orientation is vertical, the local predictor PL3 is selected,
the orientation is diagonal, the local predictor PL4 is selected,
if no orientation emerges, the local predictor PL1 is selected.

A syntax element is coded in the data stream STR to indicate to the decoder which local predictor was used to predict the current block.

According to a particular embodiment of the invention, during a step E221, a quantization step $\delta_2$ is determined. According to the particular embodiment described here, the quantization step $\delta_2$ depends on the same quantization parameter as the quantization step $\delta_1$ that would be determined in step E210 if the current block was coded according to the first coding mode.

According to one variant, the quantization step $\delta_2$ can be determined according to the quantization step $\delta_1$. For example, a linear or polynomial function can be used, such as $\delta_2=a_1*\delta_1+b_1$, where $a_1$ and $b_1$ are predetermined integers or real numbers, or $\delta_2=c_1*\delta_1^2+d_1*\delta_1+e_1$ or $c_1$, $d_1$, and $e_1$ are predetermined integers or real numbers. For example, $a_1=2$, $b_1=10$, $c_1=0.1$, $d_1=2$ and $e_1=10$. Other values are possible.

According to another variant, the quantization step $\delta_2$ can be determined from the parameter λ setting the compromise between compression and quality. This Lagrangian parameter λ can be entered by the user or defined by the encoder, similarly to $\delta_1$ or determined from the previously mentioned quantization parameter QP.

According to another variant, the quantization step $\delta_2$ can be set directly by the user, and it is then the quantization step $\delta_1$ that depends on $\delta_2$.

In a step E222, a prediction residue R1 is calculated for the current block. For this purpose, once the local predictor is chosen, for each current pixel of the current block:

the current pixel X of the current block is predicted by the selected local predictor PL, using either pixels outside the block and already reconstructed (and thus available with their decoded value), or pixels previously reconstructed in the current block, or both, in order to obtain a predicted value PRED. In all cases, the predictor PL uses previously reconstructed pixels. In FIG. 3, it can be seen that the pixels of the current block located on the first row and/or the first column of the current block will use as reference pixels (to construct the predicted value PRED) pixels outside the block and already reconstructed (pixels in grey in FIG. 3) and possibly already reconstructed pixels of the current block. For the other pixels of the current block, the reference pixels used to construct the predicted value PRED are located inside the current block.

the difference DIFF between PRED and X is quantized into a value Q(X), by a quantization step scalar quantizer $\delta_2$, by Q(X)=ScalarQuant(DIFF)=ScalarQuant($\delta_2$, X-PRED), the scalar quantizer being for example a nearest-neighbour scalar quantizer such as:

$$ScalarQuant(\Delta, x) = \text{floor}\left(\frac{x + \frac{\Delta}{2}}{\Delta}\right).$$

Q(X) is the quantized residue associated with X. It is calculated in the spatial domain, i.e. calculated directly from the difference between the predicted value PRED of the pixel X and the original value of X. Such a quantized residue Q(X) for the pixel X is stored in a quantized prediction residue block $R1_Q$, that will be coded later.

the decoded predicted value P1(X) of X is calculated by adding to the predicted value PRED the dequantized value of the quantized residue Q(X). The decoded predicted value P1(X) of X is thus obtained by P1(X)=PRED+ScalarDequant($\delta_2$, Q(X)). For example, the nearest scalar quantization inverse function is given by: ScalarDequant(Δ, x)=Δ×x.

The decoded predicted value P1(X) thus makes it possible to predict possible pixels that remain to be processed in the current block. Moreover, the block P1 comprising the decoded/reconstructed values of the pixels of the current block is the ILR predictor of the current block (as opposed to the conventional intra predictor).

The sub-steps described above are performed for all the pixels of the current block, in a scanning order that ensures that the pixels used for the prediction chosen from PL1, . . . , PL4 are available.

According to an embodiment variant, the scanning order of the current block is the lexicographical order, i.e. from left to right, and from top to bottom.

According to another embodiment variant, several scanning orders of the current block can be used, for example:
the lexicographical order, or
scanning the first column from top to bottom, then the column just to the right of it, etc., or,
scanning the diagonals one after the other.

According to this other variant, it is possible to simulate the coding cost associated with each of the scanning orders and to choose the best scanning order for the current block in terms of rate/distortion, then to code for the current block an item of information representative of the chosen scanning order.

At the end of step E222, the quantized residue block $R1_Q$ was determined. This quantized residue block $R1_Q$ must be coded for transmission to the decoder. The predictor P1 of the current block was also determined.

In a step E223, the quantized residue block $R1_Q$ is coded for transmission to the decoder. Any known approach such as the method described in HEVC can be used to code the quantized coefficients of a conventional prediction residue. For example, according to an embodiment variant, the values of the quantized residue block $R1_Q$ are coded using an entropy encoder in the data stream STR.

According to a particular embodiment of the invention, it is possible to determine and code an additional prediction residue R2 from the ILR predictor obtained for the current block. The coding of an additional prediction residue R2 is, however, optional. It is indeed possible to simply code the current block by its predicted version P1 and the quantized residue $R1_Q$.

In order to code an additional prediction residue R2 for the current block, the following steps are implemented.

In a step E224, the difference R2 between the predictor P1 and the original current block $X_b$ is calculated to form an additional residue R2: $R2=X_b-P1$. The following steps correspond to the conventional coding steps for this residue R2.

In a step E225, the residue R2 is transformed using a frequency transform in order to produce the block of coefficients $R2_T$.

The transform can be a DCT-type transform for example. It is possible to choose the transform to be used from a predetermined set of transforms $E_{T2}$ and to inform the decoder of the transform used. In this case, the set $E_{T2}$ can be different from the set $E_T$, in order to adapt to the particular statistics of the residue R2.

In a step E226, the block of coefficients $R2_T$ is quantized, for example using a quantization step scalar quantization $\delta$. This produces the block $R2_{TQ}$.

The quantization step $\delta$ can be set by the user. It can also be calculated using another parameter $\lambda$ setting the compromise between compression and quality and entered by the user or the encoder. For example, the quantization step $\delta$ can correspond to the quantization step $\delta_1$ or be determined similarly to it.

In a step E227, the coefficients of the quantized block $R2_{TQ}$ are then transmitted in a coded manner. For example, the coding specified in the HEVC standard can be used.

In a known manner, the current block is decoded by dequantizing the coefficients of the quantized block $R2_{TQ}$, then applying the inverse transform to the dequantized coefficients to obtain the decoded prediction residue. The prediction P1 is then added to the decoded prediction residue in order to reconstruct the current block and obtain its decoded version $X_{rec}$. The decoded version $X_{rec}$ of the current block can then be used later to spatially predict other neighbouring blocks of the image or to predict blocks of other images by inter-image prediction.

When the current block is coded according to the second coding mode M2, a conventional intra prediction mode is determined and associated with the current block. For this purpose, in a step E228, an intra prediction mode is determined for the current block in the list of intra prediction modes available in the conventional intra coding mode M1.

Several embodiment variants are possible.

According to a variant, the list of MPM prediction modes is created for the current block according to the mechanism described above for coding according to the first coding mode M1. According to this variant, the prediction mode is determined as the first mode in the MPM list. According to this variant, it is possible to create only a sub-part of the MPM list since this involves selecting the first element of the MPM list.

In another variant, the prediction mode is predetermined. For example, it can be a prediction mode defined by default, or transmitted in the data stream. For example, the predetermined prediction mode is the PLANAR mode of the HEVC standard.

According to another variant, the prediction mode is determined as the intra prediction mode that best approximates the decoded current block $X_{rec}$. According to this variant, all the prediction modes or only some of them (for example, those comprised in the MPM list) are evaluated by measuring a distortion between the decoded current block $X_{rec}$ and the predicted block obtained by the evaluated prediction mode. The intra prediction mode providing the smallest distortion is selected.

According to another variant, the prediction mode is determined as the intra prediction mode that best approximates the predicted current block P1 obtained by the ILR prediction.

According to this variant, all the prediction modes or only some of them (for example, those comprised in the MPM list) are evaluated by measuring a distortion between the predicted current block P1 and the predicted block obtained by the evaluated prediction mode. The intra prediction mode providing the smallest distortion is selected.

According to another variant, when for an ILR coded block, there are several possible local predictors, the intra prediction mode can be dependent on the local predictor chosen to predict the current block. For example, an association table known to the encoder and the decoder indicates which intra prediction mode should be associated with the current block according to the chosen local predictor.

In a step E229, the determined intra prediction mode is associated with the current block. The idea here is to associate an intra prediction mode but not to transmit it to the decoder. The method that determines the intra mode to be associated with the current block is reproducible in the decoder and does not require the transmission of any information.

Several embodiment variants have been described above, but the encoder and the decoder must, of course, implement the same variant.

The intra prediction mode associated with the current block can then be used to:
predict the intra prediction mode of a subsequent block that would be coded in conventional intra mode, or
determine, where appropriate, the intra prediction mode to be associated with a subsequent block that would be coded according to another coding mode distinct from the conventional intra prediction mode. This other coding mode could be an ILR coding mode, or other (inter, etc.).

In a step E23, it is checked if the current block is the last block of the image to be processed by the coding method, taking into account the previously defined scanning order. If yes, the method proceeds to coding (step E25) the next image of the video, if any. If not, in a step E24, the subsequent block of the image to be processed is selected according to the previously defined scanning order of the image and the coding method proceeds to step E2, where the selected block becomes the current block to be processed.

FIG. 4 shows steps of the method for decoding a stream STR of coded data representative of a sequence of images $I_1$, $I_2$, ..., $I_{Nb}$ to be decoded according to a particular embodiment of the invention.

For example, the data stream STR was generated via the coding method shown in relation to FIG. 1. The data stream STR is provided as input to a decoding device DEC, as described in relation to FIG. 7.

The decoding method decodes the stream image by image and each image is decoded block by block.

In a step E40, an image $I_j$ to be decoded is subdivided into blocks. Each block will undergo a decoding operation consisting in a series of steps that are detailed hereafter. Blocks can be the same size or different sizes.

In an optional step E401, according to a particular embodiment of the invention, a quantization parameter QP is read from the data stream STR.

In a step E41, a first block or sub-block $X_b$ to be decoded of the image $I_j$ is selected as the current block according to a predetermined scanning order of the image $I_j$. For example, it can be the first block in the lexicographical scanning order of the image.

In a step E42, an item of information indicating a coding mode for the current block is read from the data stream STR. According to the particular embodiment described here, this item of information indicates if the current block is coded according to a first coding mode M1 or according to a second coding mode M2. According to the particular embodiment described here, the first coding mode M1 corresponds to the conventional intra prediction coding of the current block, for example as defined according to the HEVC standard, and the second coding mode M2 corresponds to the In-Loop Residual (ILR) prediction coding.

In other particular embodiments, the item of information read from the stream STR can also indicate the use of other coding modes to code the current block (not described here).

The step E43 for decoding the current block when the current block is coded according to the first coding mode M1 is described below.

In a step E430, a quantization step $\delta_1$ is determined. For example, the quantization step $\delta_1$ is determined from the quantization parameter QP read in step E401 or similarly to what was done at the encoder. For example, the quantization step $\delta_1$ can be calculated using the quantization parameter QP read in step E401. For example, the quantization parameter QP can be the quantization parameter conventionally used in the AVC or HEVC standards. Thus, in the HEVC standard, the quantization step $\delta_1$ is determined by the equation $\delta_1$=levelScale[QP %6]<<(QP/6)) where levelScale [k]={40, 45, 51, 57, 64, 72} for k=0.5.

In a step E431, the prediction mode chosen to code the current block is decoded from the neighbouring blocks. For this purpose, as it was done at the encoder, the intra prediction mode chosen for the current block is coded using the intra prediction modes associated with the neighbouring blocks of the current block.

According to a variant of the particular embodiment of the invention described here, the intra prediction mode associated with a block is:
the intra prediction mode that was used to predict the block if the block was coded by a conventional intra prediction coding mode,
the intra prediction mode that was associated with the block if the block was coded by a coding mode distinct from a conventional intra prediction. An example of such an association is described later in reference to steps E449 and E450.

The construction of both MPM and non-MPM lists is strictly similar to what was done during coding. According to the HEVC standard, syntax elements of the following type are decoded:
a binary indicator indicating if the prediction mode to be coded for the current block is in the MPM list or not,
if the prediction mode of the current block belongs to the MPM list, an index in the MPM list corresponding to the prediction mode of the current block is coded,
if the prediction mode of the current block does not belong to the MPM list, an index in the non-MPM list corresponding to the prediction mode of the current block is coded.

The binary indicator and the prediction mode index are thus read for the current block from the data stream STR, to decode the intra prediction mode of the current block.

In a step E432, the decoder constructs a predicted block P for the current block from the decoded prediction mode.

In a step E433, the decoder decodes the coefficients of the quantized block $R_{TQ}$ from the data stream STR, for example using the decoding specified in the HEVC standard.

In a step E434, the decoded block $R_{TQ}$ is dequantized, for example using a quantization step scalar dequantization $\delta_1$. This produces the block of dequantized coefficients $R_{TQD}$.

In a step E435, an inverse frequency transform is applied to the block of dequantized coefficients $R_{TQD}$ in order to produce the decoded prediction residue block $R_{TQDI}$. The transform could be an inverse DCT-type transform for example. It is possible to choose the transform to be used from a predetermined set of transforms $E_{TI}$ by decoding an indicator from the data stream STR.

In a step E436, the current block is reconstructed from the predicted block P obtained in step E432 and the decoded residue block $R_{TQDI}$ obtained in step E435, in order to produce the decoded current block $X_{rec}$, by $X_{rec}$=P+$R_{TQDI}$.

In a step E437, the intra prediction mode decoded in step E431 is associated with the current block.

The step E44 for decoding the current block when the current block is coded according to the second coding mode M2 is described below.

In a step E440, the local predictor PL used to predict the pixels of the current block is determined. In the case where only one predictor is available, the local predictor is, for example, set by default at the decoder level and no syntax element needs to be read from the stream STR to determine it.

In the case where several local predictors are available, for example the predictors PL1-PL4 described above, a syntax element is decoded from the data stream STR to identify which local predictor was used to predict the current block. The local predictor is thus determined from that decoded syntax element.

In a step E441, the quantization step $\delta_2$ is determined, similarly to what was done at the encoder.

In a step E442, the quantized residue $R1_Q$ is decoded from the data stream STR. Any known approach such as the method described in HEVC can be used to decode the quantized coefficients of the conventional prediction residue.

In a step E443, the quantized residue block $R1_Q$ is dequantized using the quantization step $\delta_2$, in order to produce the dequantized residue block $R1_QD$.

In a step E444, when the dequantized residue block $R1_{QD}$ is obtained, the predicted block P1 is constructed using the local predictor PL determined in step E440.

In step E444, each pixel of the current block is predicted and reconstructed as follows:
- the current pixel X of the current block is predicted by the selected predictor PL, using either pixels outside the block and already reconstructed, or previously reconstructed pixels of the current block, or both, in order to obtain a predicted value PRED. In all cases, the predictor PL uses previously decoded pixels;
- the decoded predicted value P1(X) of the current pixel X is calculated by adding to the predicted value PRED the dequantized value of the prediction residue $R1_{QD}$, such that $P1(X)=PRED+R1_{QD}(X)$.

These steps are implemented for all the pixels of the current block, in a scanning order that ensures that the pixels used for the prediction chosen from PL1, ... , PL4 are available.

For example, the scanning order is the lexicographical order (from left to right, then rows from top to bottom).

According to a particular embodiment of the invention, the predicted block P1 comprising the decoded predicted values P1(X) of each pixel of the current block forms here the decoded current block $X_{rec}$.

According to another particular embodiment of the invention, it is considered here that an additional prediction residue was coded for the current block. It is therefore necessary to decode this additional prediction residue in order to reconstruct the decoded version of the current block $X_{rec}$.

For example, this other particular embodiment can be activated or not by default at the encoder and decoder level. Or, an indicator can be coded in the data stream with the block level information to indicate for each block coded according to the ILR coding mode if an additional prediction residue is coded. Or further, an indicator can be coded in the data stream with the image or sequence of images level information to indicate for all the blocks of the image or of the sequence of images coded according to the ILR coding mode if an additional prediction residue is coded.

When an additional prediction residue is coded for the current block, in a step E445, the coefficients of the quantized prediction residue $R2_{TQ}$ are decoded from the data stream STR, using means adapted to those implemented at the encoder, for example the means implemented in an HEVC decoder.

In a step E446, the block of quantized coefficients $R2_{TQ}$ is dequantized, for example using a quantization step scalar dequantization $\delta_1$. This produces the block of dequantized coefficients $R2_{TQD}$.

In a step E447, an inverse frequency transform is applied to the block $R2_{TQD}$ in order to produce the decoded prediction residue block $R2_{TQDI}$.

The inverse transform could be an inverse DCT-type transform for example.

It is possible to choose the transform to be used from a predetermined set of transforms $E_{T2}$ and to decode the item of information informing the decoder of the transform to be used. In this case, the set $E_{T2}$ is different from the set $E_T$, in order to adapt to the particular statistics of the residue R2.

In a step E448, the current block is reconstructed by adding the predicted block P1 obtained in step E444 to the decoded prediction residue $R2_{TQDI}$.

When the current block is decoded, a conventional intra prediction mode is determined and associated with the current block. For this purpose, in a step E449, an intra prediction mode is determined for the current block in the list of intra prediction modes available in the conventional intra coding mode. This determination is implemented similarly to what was implemented at the encoder level.

In a step E450, the determined intra prediction mode is associated with the current block.

In a step E45, it is checked if the current block is the last block of the image to be processed by the decoding method, taking into account the previously defined scanning order. If yes, the method proceeds to decoding (step E47) the next image of the video, if any. If not, in a step E46, the subsequent block of the image to be processed is selected according to the previously defined scanning order of the image and the decoding method proceeds to step E42, the selected block becoming the current block to be processed.

FIG. 5 illustrates a signal example STR comprising coded data representative of at least one block of an image according to a particular embodiment of the invention. For example, the signal STR can comprise a quantization parameter QP for determining the quantization step $\delta_1$ and the quantization step $\delta_2$ described above. This quantization parameter QP can be coded at the block level, or at the image or sequence of images level when coding a video. The signal STR comprises a coded indicator TY indicating for a block of an image a coding mode for that block When the TY indicator indicates that the block is coded according to the second coding mode, here the ILR mode, the signal then comprises coded values of quantized prediction residues $R1_Q$ and possibly coded values of quantized transformed prediction residues $R2_{TQ}$. When several local predictors are possible for the current block, the signal also comprises a local predictor PL coded indicator.

When the indicator TY indicates that the block is coded according to the first coding mode, here the conventional intra prediction mode, the signal then comprises coded values of quantized transformed prediction residues $R_{TQ}$, a binary indicator $i_{MPM}$ indicating whether or not the prediction mode to be coded for the current block is in the MPM list, and an index $idx_{MPM}$ indicating the index of current block prediction mode in the corresponding list.

FIG. 6 shows the simplified structure of a coding device COD adapted to implement the coding method according to any one of the particular embodiments of the invention.

According to a particular embodiment of the invention, the steps of the coding method are implemented by computer program instructions. For this purpose, the coding device COD has the standard architecture of a computer and notably comprises a memory MEM, a processing unit UT, equipped for example with a processor PROC, and driven by the computer program PG stored in the memory MEM. The computer program PG comprises instructions for implementing the steps of the coding method as described above, when the program is executed by the processor PROC.

At initialisation, the code instructions of the computer program PG are for example loaded into a RAM memory (not shown) before being executed by the processor PROC. In particular, the processor PROC of the processing unit UT implements the steps of the coding method described above, according to the instructions of the computer program PG.

FIG. 7 shows the simplified structure of a decoding device DEC adapted to implement the decoding method according to any one of the particular embodiments of the invention.

According to a particular embodiment of the invention, the decoding device DEC has the standard architecture of a computer and notably comprises a memory MEMO, a processing unit UT0, equipped for example with a processor PROC0, and driven by the computer program PG0 stored in the memory MEMO. The computer program PG0 comprises instructions for implementing the steps of the decoding method as described above, when the program is executed by the processor PROC0.

At initialisation, the code instructions of the computer program PG0 are for example loaded into a RAM memory (not shown) before being executed by the processor PROC0. In particular, the processor PROC0 of the processing unit UT0 implements the steps of the decoding method described above, according to the instructions of the computer program PG0.

The invention claimed is:

1. A method for decoding a coded data stream representative of at least one image, said image being split into blocks, the decoding method comprising performing by a decoding device, for at least one block of the image, referred to as a current block:
- determining if the current block is coded according to an intra coding mode or another coding mode, the intra coding mode, called conventional intra coding mode being a coding mode using an intra prediction mode to decode the current block, said intra prediction mode being selected from a group of intra prediction modes, the other coding mode being any type of coding mode distinct from the conventional intra coding mode,
- in response to the current block being coded according to said conventional intra coding mode:
  - determining, for the current block, an intra prediction mode in said group of intra prediction modes, according to at least one intra prediction mode associated with a previously decoded block of the image, and
  - decoding said current block according to said determined intra prediction mode,
- in response to the current block being coded according to said other coding mode:
  - decoding said current block according to said other coding mode, and
  - associating with the current block, an intra prediction mode said intra prediction mode being selected in said group of intra prediction modes, and
- said method further comprising, for another block of the image:
  - in response to said another block being coded according to said conventional intra coding mode and the current block being coded according to said other coding mode, using the intra prediction mode associated with the current block to decode said another block.

2. A method for coding a coded data stream representative of at least one image, said image being split into blocks, the coding method comprising performing by a coding device, for at least one block of the image, referred to as a current block:
- determining if the current block is coded according to an intra coding mode or another coding mode, the intra coding mode, called conventional intra coding mode, being a coding mode using an intra prediction mode to code the current block, said intra prediction mode being selected from a group of intra prediction modes, the other coding mode being any type of coding mode distinct from the conventional intra coding mode,
- in response to the current block being coded according to said conventional intra coding mode:
  - determining, for the current block, an intra prediction mode in a group of intra prediction modes, according to at least one intra prediction mode associated with a previously decoded block of the image, and
  - coding said current block according to said determined intra prediction mode,
- in response to the current block being coded according to said other coding mode:
  - coding said current block according to said other coding mode, and
  - associating with the current block, an intra prediction mode, said intra prediction mode being selected in said group of intra prediction modes, and
- said method further comprising, for another block of the image:
  - in response to said another block being coded according to said conventional intra coding mode and said current block being coded according said other coding mode, using the intra prediction mode associated with the current block to code said other block.

3. The method according to claim 1, wherein the determination of an intra prediction mode in a group of intra prediction modes, according to at least one intra prediction mode associated with a previously decoded block of the image, comprises constructing a list comprising a subset of intra prediction modes selected from said group of intra prediction modes according to said at least one intra prediction mode associated with a previously decoded block of the image, and wherein, in response to the current block being coded according to said other coding mode, the determination of an intra prediction mode in said group of intra prediction modes comprises constructing at least one part of said list for the current block, and the determined intra prediction mode corresponds to the first intra prediction mode in the list.

4. The method according to claim 1, wherein in response to the current block being coded according to said other coding mode, the determined intra prediction mode corresponds to a predetermined prediction mode.

5. The method according to claim 1, wherein, in response to the current block being coded according to said other coding mode, the intra prediction mode determined for the current block corresponds to an intra prediction mode selected from at least one subset of the group of intra prediction modes as providing a predicted block for the current block for which a distortion calculated between said predicted block and the decoded current block is minimal.

6. The method according to claim 1, wherein in response to the current block being coded according to said other coding mode, the decoding of said current block comprises a prediction of said current block providing a first predicted current block, the intra prediction mode determined for the current block corresponds to an intra prediction mode selected from at least one subset of the group of intra prediction modes as providing a second predicted block for the current block for which a distortion calculated between said second predicted block and said first predicted current block is minimal.

7. The method according to claim 6, wherein:
the prediction of said current block providing a first predicted current block comprises, for each pixel of the current block, obtaining a prediction of said pixel from another previously decoded pixel, said other previously decoded pixel belonging to said current block or to a previously decoded block of the image, and in response to said other previously decoded pixel belonging to said current block, said other previously decoded pixel is obtained by:
  decoding a prediction residue associated with said other pixel,
  reconstructing said other pixel by adding a prediction of said other pixel to the decoded residue.

8. The method according to claim 1, wherein:
in response to the current block being coded according to said other coding mode, the decoding of said current block comprising:
  determining a local prediction function for the current block from a group of predetermined local prediction functions,
  predicting said current block comprising, for each pixel of the current block:
    obtaining a prediction of said pixel according to said local prediction function using at least one previously decoded pixel neighbouring said pixel, said previously decoded pixel belonging to said current block or to a previously decoded block of the image,
  the intra prediction mode determined for the current block corresponds to an intra prediction mode selected from the group of intra prediction modes according to the local prediction function.

9. The method according to claim 8, wherein the intra prediction mode for the current block is determined from a correspondence table associating an intra prediction mode with a local prediction function of the group of predetermined local prediction functions.

10. The method according to claim 1, wherein, for a block neighbouring the current block, located after the current block according to a scanning order of the blocks of the image for decoding, the neighbouring block being coded according to said intra coding mode, the method comprises:
  determining, for the current block, an intra prediction mode in a group of intra prediction modes, according to at least the intra prediction mode associated with the current block,
  decoding said neighbouring block according to said determined intra prediction mode,
  associating with said neighbouring block said determined intra prediction mode.

11. The method according to claim 1, wherein, for a neighbouring block of the current block, located after the current block according to a scanning order of the blocks of the image for decoding, the neighbouring block being coded according to said other coding mode, the method comprises:
  decoding said neighbouring block according to said other coding mode,
  determining, for the neighbouring block, an intra prediction mode in said group of intra prediction modes, according to the intra prediction mode associated with the current block,
  associating with said neighbouring block said determined intra prediction mode.

12. A device for decoding a coded data stream representative of at least one image, said image being split into blocks, the decoding device comprising:
  a processor configured, for at least one block of the image, referred to as the current block, to:
  determine if the current block is coded according to an intra coding mode or another coding mode, the intra coding mode, called conventional intra coding mode, being a coding mode using an intra prediction mode to code the current block, said intra prediction mode being selected from a group of intra prediction modes according to at least one intra prediction mode associated with a neighbouring block of the current block, the other coding mode being any type of coding mode distinct from the conventional intra coding mode,
  in response to the current block being coded according to said conventional intra coding mode:
    determine, for the current block, an intra prediction mode in a group of intra prediction modes, according to at least one intra prediction mode associated with a previously decoded block of the image, and
    decode said current block according to said determined intra prediction mode,
  in response to the current block being coded according to said other coding mode:
    decode said current block according to said other coding mode, and
    associate with the current block, an intra prediction mode, said intra prediction mode being selected in said group of intra prediction modes, and
  said processor being further configured, for another block of the image, in response to said other block being coded according to said conventional intra coding mode and said current block being coded according said other coding mode, to use the intra prediction mode associated with the current block to decode said other block.

13. A device for coding a coded data stream representative of at least one image, said image being split into blocks, the coding device comprising:
  a processor configured, for at least one block of the image, referred to as the current block, to:
  determine if the current block is coded according to an intra coding mode or another coding mode, the intra coding mode, called conventional intra coding mode, being a coding mode using an intra prediction mode to code the current block, said intra prediction mode being selected from a group of intra prediction modes, the other coding mode being any type of coding mode distinct from the conventional intra coding mode,
  in response to the current block being coded according to said conventional intra coding mode:
    determine, for the current block, an intra prediction mode in a group of intra prediction modes, according to at least one intra prediction mode associated with a previously decoded block of the image, and
    code said current block according to said determined intra prediction mode,
  in response to the current block being coded according to said other coding mode:
    code said current block according to said other coding mode, and
    associate with the current block, an intra prediction mode, said intra prediction mode being selected in said group of intra prediction modes, and
  said processor being further configured, for another block of the image, in response to said other block being coded according to said conventional intra coding mode and said current block being coded according said other coding mode, to use the intra prediction mode associated with the current block to code said other block.

14. A non-transitory computer-readable storing medium comprising computer program instructions for implementing a method for decoding a coded data stream representative of at least one image, when said program is executed by a processor of a decoding device, said image being split into blocks, wherein the instructions configure the decoding device to perform, for at least one block of the image, referred to as a current block:
  determining if the current block is coded according to an intra coding mode or another coding mode, the intra coding mode, called conventional intra coding mode, being a coding mode using an intra prediction mode to code the current block, said intra prediction mode being selected from a group of intra prediction modes, according to at least one intra prediction mode associated with a neighbouring block of the current block, the other coding mode being any type of coding mode distinct from the conventional intra coding mode,
  in response to the current block being coded according to said conventional intra coding mode:
    determining, for the current block, an intra prediction mode in said group of intra prediction modes, according to at least one intra prediction mode associated with a previously decoded block of the image, and
    decoding said current block according to said determined intra prediction mode,
  in response to the current block being coded according to said other coding mode:
    decoding said current block according to said other coding mode, and
    associating with the current block, an intra prediction mode, selected in said group of intra prediction modes,
  wherein the instructions further configure the decoding device to perform, for another block of the image:
    in response to said another block being coded according to said conventional intra coding mode and said current block being coded according said other coding mode, using the intra prediction mode associated with the current block to decode said another block.

15. A non-transitory computer-readable storing medium comprising computer program instructions for implementing a method for coding a coded data stream representative of at least one image, when said program is executed by a processor of a coding device, said image being split into blocks, wherein the instructions configure the coding device to perform, for at least one block of the image, referred to as a current block:
  determining if the current block is coded according to an intra coding mode or another coding mode, the intra coding mode, called conventional intra coding mode, being a coding mode using an intra prediction mode to code the current block, said intra prediction mode being selected from a group of intra prediction modes according to at least one intra prediction mode associated with a neighbouring block of the current block, the other coding mode being any type of coding mode distinct from the conventional intra coding mode,
  in response to the current block being coded according to said conventional intra coding mode:
    determining, for the current block, an intra prediction mode in a group of intra prediction modes, according to at least one intra prediction mode associated with a previously decoded block of the image, and
    coding said current block according to said determined intra prediction mode,
  in response to the current block being coded according to said other coding mode:
    coding said current block according to said other coding mode, and
    associating with the current block, an intra prediction mode, said intra prediction mode being selected in said group of intra prediction modes,
  wherein the instructions further configure the coding device to perform, for another block of the image:
    in response to said another block being coded according to said conventional intra coding mode and said current block being coded according said other coding mode, using the intra prediction mode associated with the current block to code said another block.

16. The method according to claim 2, wherein the determination of an intra prediction mode in a group of intra prediction modes, according to at least one intra prediction mode associated with a previously decoded block of the image, comprises constructing a list comprising a subset of intra prediction modes selected from said group of intra prediction modes according to said at least one intra prediction mode associated with a previously decoded block of the image, and
wherein, in response to the current block being coded according to said other coding mode, the determination of an intra prediction mode in said group of intra prediction modes comprises constructing at least one part of said list for the current block, and the determined intra prediction mode corresponds to the first intra prediction mode in the list.

17. The method according to claim 2, wherein in response to the current block being coded according to said other coding mode, the determined intra prediction mode corresponds to a predetermined prediction mode.

18. The method according to claim 2, wherein, in response to the current block being coded according to said other coding mode, the intra prediction mode determined for the current block corresponds to an intra prediction mode selected from at least one subset of the group of intra prediction modes as providing a predicted block for the current block for which a distortion calculated between said predicted block and the decoded current block is minimal.

19. The method according to claim 2, wherein in response to the current block being coded according to said other coding mode, the coding of said current block comprises a prediction of said current block providing a first predicted current block, the intra prediction mode determined for the current block corresponds to an intra prediction mode selected from at least one subset of the group of intra prediction modes as providing a second predicted block for the current block for which a distortion calculated between said second predicted block and said first predicted current block is minimal.

20. The method according to claim 2, wherein, for a block neighbouring the current block, located after the current block according to a scanning order of the blocks of the image for coding, the neighbouring block being coded according to said intra coding mode, the method comprises:
  determining, for the current block, an intra prediction mode in a group of intra prediction modes, according to at least the intra prediction mode associated with the current block,
  coding said neighbouring block according to said determined intra prediction mode,
  associating with said neighbouring block said determined intra prediction mode.

21. The method according to claim 1, wherein, the other coding mode being a DPCM or an ILR coding mode, the associated intra prediction mode is selected depending on a local predictor used for decoding the current block.

\* \* \* \* \*